United States Patent
Yamada et al.

(10) Patent No.: US 8,487,222 B2
(45) Date of Patent: Jul. 16, 2013

(54) HEATING ELECTRODE AND METHOD FOR HEATING MATERIAL-TO-BE-HEATED BY USING THE HEATING ELECTRODE

(75) Inventors: Shinji Yamada, Yokohama (JP); Hideo Kurashima, Yokohama (JP); Yasunori Onozawa, Yokohama (JP); Mitsuhiro Yoshida, Yokohama (JP); Takayoshi Otsu, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 736 days.

(21) Appl. No.: 12/668,085

(22) PCT Filed: Jul. 8, 2008

(86) PCT No.: PCT/JP2008/062323
§ 371 (c)(1),
(2), (4) Date: Jan. 7, 2010

(87) PCT Pub. No.: WO2009/008421
PCT Pub. Date: Jan. 15, 2009

(65) Prior Publication Data
US 2010/0326982 A1 Dec. 30, 2010

(30) Foreign Application Priority Data
Jul. 10, 2007 (JP) .................... 2007-181106

(51) Int. Cl.
*H05B 3/08* (2006.01)
(52) U.S. Cl.
USPC ............................. 219/541; 219/538; 219/388
(58) Field of Classification Search
USPC ........................................ 219/541, 538, 388
See application file for complete search history.

(56) References Cited

U.S. PATENT DOCUMENTS

| 4,974,503 A | 12/1990 | Koch |
| 7,092,607 B2 * | 8/2006 | Fukuda et al. ............... 385/129 |

FOREIGN PATENT DOCUMENTS

| DE | 38 18 491 A1 | 12/1989 |
| EP | 0 128 397 A2 | 12/1984 |
| JP | 2000-106854 A | 4/2000 |
| JP | 3352388 B2 | 9/2002 |
| JP | 2003-47413 A | 2/2003 |
| JP | 3604109 B2 | 10/2004 |
| JP | 2004-349116 A | 12/2004 |
| JP | 2007-159413 A | 6/2007 |

OTHER PUBLICATIONS

International Search Report for the Application No. PCT/JP2008/062323 mailed Oct. 14, 2008.
International Preliminary Report on Patentability for Application No. PCT/JP2008/062323 mailed Feb. 4, 2010.
Supplementary European Search Report for the Application No. EP 08 79 0960 dated Aug. 9, 2011.

* cited by examiner

*Primary Examiner* — Samuel Gebremariam
(74) *Attorney, Agent, or Firm* — Cheng Law Group, PLLC

(57) ABSTRACT

[PROBLEMS] To provide a heating electrode which can uniformly heat a material to be heated having an irregular shape and can stably perform heating/holding-convey of the material to be heated by the heating electrode; and a method for heating food by using the heating electrode.
[MEANS FOR SOLVING PROBLEMS] An assembly of pin electrodes (10) formed by conductive pins are slidably arranged in a through hole (21) of a pin support table (20). A pressure-variable gas chamber (30) whose pressure is variable is connected to the pin support table (20). By applying a plus pressure or a minus pressure to the gas chamber (30), the pin electrodes (10) are displaced relatively to the pin support table (20).

12 Claims, 6 Drawing Sheets

HEATING ELECTRODE AND METHOD FOR HEATING MATERIAL-TO-BE-HEATED BY USING THE HEATING ELECTRODE

TECHNICAL FIELD

The present invention relates to a heating electrode and a method for heating a material to be heated by using the heating electrode, and more particularly to a heating electrode that can uniformly heat the material having an irregular shape and can stably perform heating-holding and conveying of the material with the heating electrode and to a method for heating the material by using the heating electrode.

BACKGROUND ART

A conductive heating method, a dielectric heating method, and an induction heating method are well known as methods for electrically heating a food material, for example. Among them, the conductive and dielectric heating method conduct heating by the heat generated by the material (food) itself and are significantly different from the induction heating method by which heating is conducted by using Joule heat generated inside the metal container by a induced current (eddy current). In the case of the conductive heating method, the electric current directly flows in food and it is necessary to bring the upper and lower electrodes into contact with the food. In this case, where the food does not have a uniform thickness, there are zones on the food surface that are in contact with food and those that are not. The contactless zones are unevenly heated and are not heated sufficiently, whereas the contact zones can be overheated, that is, excessively heated. In the case of dielectric heating, the electric current does not flow directly through food, but where the food thickness is not uniform, both of the electric field intensity and dielectric constant differ significantly between zones that are in contact with the electrodes and those that are not, causing problems similar to those encountered in the conductive heating method. A conductive heating device is known (see, for example, Patent Document 1) in which in order to heat uniformly such food of irregular shape that has uneven thickness, an electrolytic solution is sprayed over the food surface to form a thin electrolyte film, a flexible electrode having good electric conductivity, composed of a flexible member, for example, a metal foil such as titanium, aluminum, iron, platinum, and stainless steel, and formed in a split-curtain-like shape suspended from a frame is used as the upper electrode, the upper electrode can be moved in the vertical direction, and the height of the upper electrode can be adjusted, thereby making it possible to conduct uniform heating of thick and thin portions of the food. A similar conductive heating device for food is also known (see, for example, Patent Document 2) in which the upper conductive portion (upper electrode) is composed of a supply tank that supplies an electrolytic solution and a flexible split-curtain-shaped conducive brush that hangs down from the supply tank, wherein the electrolyte drops or flows down onto the food through the brush. Further, a method for manufacturing a sterilized solid food product is known (see, for Example, Patent Document 3) by which a solid food product is tightly packaged with a packaging material to form a package, the package is disposed in a fluid body inside a pressure variable container, and a high-frequency electric field is applied to the container to conduct dielectric heating of the package.

Patent Document 1: Japanese Patent Application. Laid-open No. 2003-47413.

Patent Document 2: Japanese Patent No. 3352388.

Patent Document 3: Japanese Patent No. 3604109.

Furthermore, heating electrodes that are disposed opposite each other and are used to electrically heat material are known from JP 2007/159413. These electrodes are supported by a support means and axially slidable within the support means. With the pin displacement means the pin electrodes are axially displaceable.

DISCLOSURE OF THE INVENTION

Problem to be Solved by the Invention

In the case of the above-described conductive heating device, in order to heat uniformly food having an irregular shape, a special "pre-treatment" including bringing the upper electrode into contact only with the thick portion of the food, maintaining this state for several tens of seconds, then bringing the upper electrode into contact with both the thick portion and the thin portion, and heating by maintaining this state for several tens of seconds has to be conducted prior to "the usual conductive heating treatment" in which the food material is conveyed and passed by the split-curtain-shaped upper electrode.

However, because the upper electrode is a split-curtain-shaped flexible electrode, holding and conveying with the electrode is impossible. As a result, when the "pre-treatment" is performed, conveying of the food with the conveyor has to be stopped for a certain time. Further, it is generally practically impossible to form a uniform thin film of an electrolyte of the surface of food of irregular shape by coating or dropping the electrolyte. The resultant problem is that the food of irregular shape is difficult to heat stably and uniformly by heating performed by conduction through a thin film of the electrolyte.

Next, in the case where sterilized solid food is manufactured by sealing the above-described package together with a fluid in a container and heating by applying a high-frequency electric field to the container, the distance between the electrodes is the same, regardless of the location in the container, but the thickness of the fluid inside the container differs depending on the location in the container. Therefore, the dielectric constant differs depending on the location in the container, consequently an uneven heating possibly occur, and stable uniform heating is also difficult to perform.

Accordingly, the present invention has been created to resolve the above-described problems inherent to prior art, and it is an object of the present invention to provide a heating electrode that enables uniform heating of a material of irregular shape and can stably conduct heating-holding and conveying of the material therewith and also to provide a method for heating the material by using the heating electrode.

Means for Solving the Problem

In order to attain the aforementioned object, the heating electrodes according to an embodiment of the present invention are heating electrodes that are disposed opposite each other and electrically heat a material to be heated, wherein at least one electrode of the heating electrodes is an assembly of pin electrodes formed of a plurality of electrically conductive pins, and the pin electrodes can be extended and contracted in an axial direction.

In these heating electrodes, at least one electrode of the heating electrodes is an assembly of pin electrodes that is composed of a plurality of electrically conductive pins, and the pin electrodes can be extended and contracted in an axial direction. Therefore, the pin electrodes can trace the shape of the material to be heated. As a result, the pin electrodes can come into uniform contact with the material to be heated and produce uniform electric effect thereupon. As a result, stable uniform heating can be conducted, regardless of the shape of the material to be heated. Furthermore, in a case where the pushing force by which the pin electrodes are brought into contact with the material to the heated can be controlled, the material to be heated can be held by the heating electrodes by setting an appropriate pushing force. Therefore, the material to the heated can be positioned and conveyed in a state in which the material to be heated is heated and held by the heating electrodes, without stopping the conveying of the material, for example, with a conveyor.

The heating electrodes include pin support means for supporting the pin electrodes to be axially slidable and pin displacement means for displacing the pin electrodes axially relative to the pin support means.

In such a heating electrode, the electrically conductive pins can slide in the pin support means. Therefore, the electrically conductive pins can trace the shape of the material to be heated, while receiving the supply of electricity or heat from the outside. Further, because the pin electrodes are displaced axially relative to the pin support means by the pin displacement means, the structure of the pin electrodes can be so simplified that the pin electrodes, for example, are not provided with an extension-contraction mechanism.

The pin support means is formed of an electrically conductive base provided with a plurality of through-holes in which the pin electrodes can slide.

In such a heating electrode, by providing through-holes in which the pin electrodes can slide in the electrically conductive base, it is possible to conduct electricity or transfer heat reliably to the pin electrodes that are displaced relative to the pin support means. Further, because of a very simple structure of electric and thermal contacts with the pin electrodes, reliability of heating electrodes is increased.

The pin displacement means is formed of a pressure-variable gas chamber joined to the electrically conductive base, forms a pressure gradient in the through-holes by changing an inner pressure of the gas chamber, and displaces the pin electrodes in the axial direction.

In these heating electrodes, one opening end portion of a through-hole is opened to the material to be heated, while the other opening end portion is opened to the gas chamber. Therefore, because the pressure in the opening end portion of the through-hole at the side of the material to be heated (outlet pressure) does not change, when the pressure inside the gas chamber changes, a pressure gradient is formed in the through-holes. Further, in a case where the inlet pressure of the through-hole is higher than the outlet pressure, the gas acts so as to push the electrically conductive pins out of the electrically conductive base. Conversely, in a case where the inlet pressure of the through-hole is lower than the outlet pressure, the gas acts so as to pull the electrically conductive pins into the electrically conductive base. In particular, in the former case, the pushing force applied by the electrically conductive pins to the material to be heated is proportional to the pressure gradient. Therefore, by ensuring a large pressure gradient, it is possible to position and convey the material to be heated, while heating and holding the material with the electrodes.

In the heating electrodes according to another embodiment, electricity or heat is applied to the electrically conductive base and then conducted or transferred to the pin electrodes via an inner wall of each of the through-holes.

In such a heating electrode, the electrically conductive pins are arranged so as to slide in the through-holes. Therefore, by applying electricity or heat to the electrically conductive base, it is possible to conduct electricity or transfer heat advantageously to the electrically conductive pins.

In the heating electrodes according to another embodiment, a flow passage of temperature-adjusting water that passes transversely between the through-holes is formed inside the electrically conductive base.

In such a heating electrode, for example, in a case where the heating temperature of the material to be heated is wished to be lowered, to flow cold water as the temperature-adjusting water allows for drawing heat from the material to be heated via the inner wall of the through-holes, and the material to be heated is prevented from overheating. Conversely, in a case where the heating temperature of the material to be heated is wished to be raised, to flow hot water as the temperature-adjusting water allows for supplying heat to the material to be heated via the inner wall of the through-holes, and the temperature of the material to be heated is adjusted to the desired temperature. In other words, by providing a flow passage of temperature-adjusting water that passes transversely between the through-holes and letting the temperature-adjusting water to flow therein, it is possible to prevent the material to be heated from overheating or insufficient heating and conduct fine adjustment of heating temperature of the material to be heated for which such an adjustment is difficult by adjusting an output or frequency of the high-frequency power source.

In the heating electrodes according to another embodiment, the other of the opposing electrodes has a concave shape molded to match a part of the outer surface shape of the material to be heated.

In such a heating electrode, for example, in a case where the material to be heated includes a rigid container such as a cup or a tray, by using an opposing electrode with an inner surface shape that matches the outer surface shape (bottom portion shape) of the container, it is possible to conduct the heating efficiently and to inhibit the expansion of the container caused by the contents thereof during heating.

In the method according to another embodiment for heating a material to be heated by using heating electrodes, the material to be heated is heated and held by the heating electrodes described in the above embodiments, or the material to be heated is heated, while being moved relative to the heating electrodes.

In such a heating method, the utilization of the above-described heating electrodes allows the pin electrodes to displace relative to each other in the axial direction and trace the shape of the material to be heated. In addition, the pushing force applied by the pin electrodes to the material to be heated can be controlled. As a result, a positioning state can be formed, and the material to be heated can be held by the plurality of pin electrodes, and the so-called positioning-conveying of the material to be heated by the electrodes can be performed, that is, the material to be heated can be heated, held, and conveyed in the positioned state. Further, it is also possible to perform heating-conveying in which the material to be heated is heated, while being moved relatively to the pin electrodes. In addition, the electrically conductive base in which the pin electrodes are slidably installed is provided with a temperature control function. Therefore, it is possible to perform fine adjustment of heating temperature of the material to be heated for which such an adjustment is difficult by adjusting an output or frequency of the high-frequency power source. Thus, using the above-described heating electrodes makes it possible to conduct stable uniform heating of the material to be heated.

In the method according to another embodiment for heating a material to be heated by using the heating electrodes heating and holding of the material to be heated is conducted via a packaging material.

With the above-described heating method, heating-holding-conveying of the material to be heated can be conducted via a packaging material. Therefore, the pin electrodes and the material to be heated become to not directly contact with each other and the sanitary heating-holding-conveying of the material to be heated can be conducted.

Effects of the Invention

With the heating electrodes in accordance with the present invention and the heating method using the heating electrodes, at least one electrode of the heating electrodes is an assembly of pin electrodes that is composed of a plurality of electrically conductive pins, the pin electrodes are slidably disposed in through-holes of an electrically conductive base, and the electrically conductive base is joined to a pressure-variable chamber. Therefore, the pin electrodes can be displaced relatively to the electrically conductive base correspondingly to the inner pressure of the pressure-variable chamber. As a result, the pin electrodes can trace the shape of the material to be heated, coming into uniform contact with the material to be heated and producing uniform electric effect thereupon. Additionally, when the pin electrodes are brought into contact with the material to be heated, by setting an internal pressure of the pressure-variable gas chamber into an appropriate value, it is possible to adjust the pushing force applied by the pin electrodes to the material to be heated. Therefore, by setting an internal pressure of the pressure-variable gas chamber, it is possible to perform heating-holding-conveying of the material to be heated with the heating electrodes. Further, because a flow passage for temperature-adjusting water is provided in a transverse direction between the through-holes of the electrically conductive base, the heat can be supplied to the material to be heated or the material can be cooled through the electrically conductive pins. As a result, a material of irregular shape that has an uneven thickness can be stably and uniformly heated.

Figure 1:
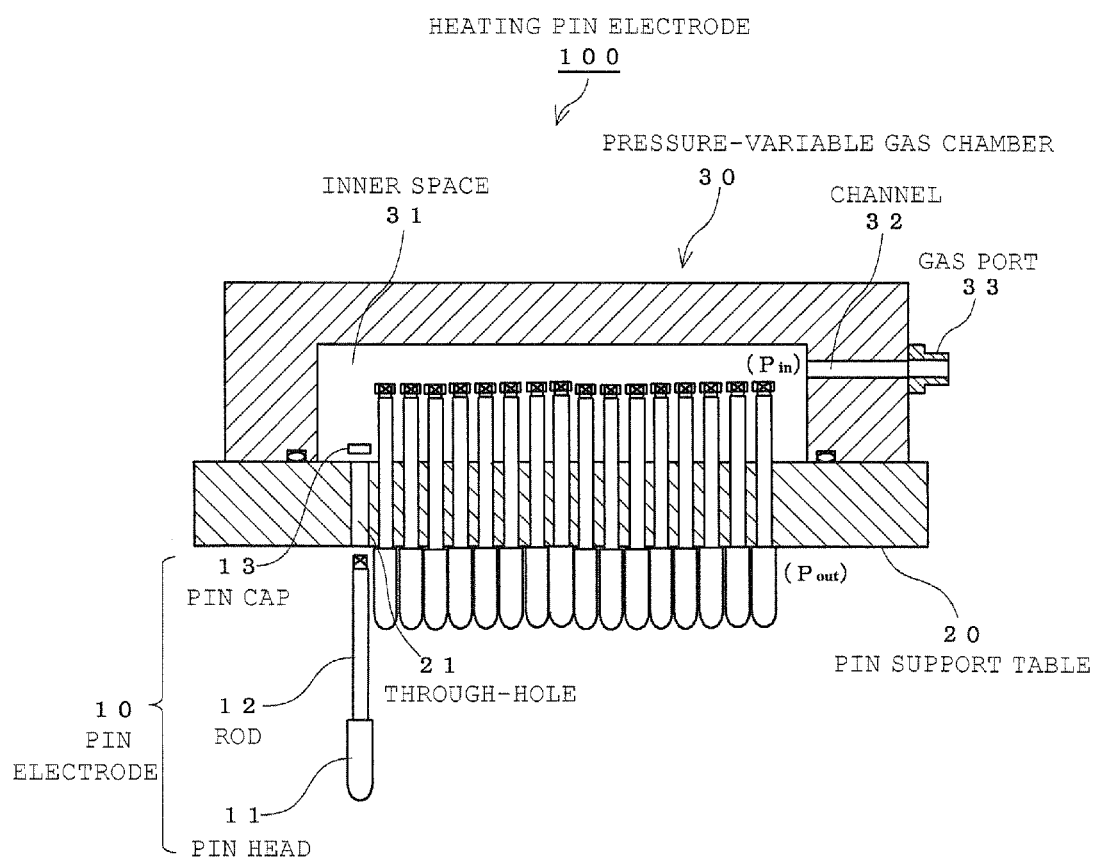
FIG. 1 is a principal sectional explanatory drawing illustrating the heating pin electrode relating to the heating electrode in accordance with the present invention.

EXPLANATION OF REFERENCE NUMERAL 10 pin electrode
11 pin head
12 rod
13 pin cap
14 spring
20 pin support table
21 through-hole
30 pressure-variable gas chamber
31 inner space
32 channel
33 gas port
34 compressor
35 vacuum pump
36 three-way valve
100 heating pin electrode

BEST MODE FOR CARRYING OUT THE INVENTION

The present invention will be described below in detail referring embodiments illustrated by the appended drawings.

FIG. 1 is a principal cross-sectional explanatory drawing illustrating a heating pin electrode 100 relating to the heating electrode in accordance with the present invention. A food material is used as a material to be heated.

The heating pin electrode 100 is comprised of a plurality of pin electrodes 10 that come into contact with the food material and act electrically and thermally thereupon, a pin support table 20 as a conductive base that supports the pin electrodes 10 to be slidable and serves as an electric power source or thermal source for the pin electrodes 10, and a pressure-variable gas chamber 30 that displaces the pin electrodes 10 with respect to the pin support table 20.

A pin electrode 10 is comprised of a pin head 11 that comes into direct contact with the food material, a rod 12 that is joined to the pin head 11, serving as an electric or thermal contact with the pin support table 20 and regulating the amount of movement (stroke) of the pin electrode 10 with respect to the pin support table 20, and a pin cap 13 that regulates the end portion of the pin head 11 and functions as a stopper.

The pin head 11 has a shape in which, for example, a semispherical portion is combined with a cylindrical portion. The rod 12 has, for example, a small-diameter long cylindrical shape, and one end thereof is screwed into the pin head 11, and the other end is screwed into the pin cap 13. The rod 12 is inserted into the below-described through-hole 21 and serves as an electric and thermal contact with the pin support table 20.

For a joint between the pin head 11 and the rod 12 is preferred a joining by screwing that makes it possible to exchange the pin heads correspondingly to the shape of the food material, but the pin head and rod may be also formed to be integrally one unit by machining or welding. Further, the rod 12 and pin cap 13 may be formed to be integrally one unit by machining, welding, or tightening, and the pin head 11 and rod 12 may be screwed together.

The pin head 11, rod 12, and pin cap 13 are made from an electrically conductive material such as aluminum, copper, carbon, titanium, or platinum.

In the pin support table 20, through-holes 21 in which pin electrodes 10 slidably displace relatively thereto are provided individually and independently for each pin electrode 10. The inner diameter of the through-hole 21 is slightly larger than the outer diameter of the rod 12 of the pin electrode 10. As a result, the pin electrodes 10 can displace individually and independently axially with respect to the pin support table 20 and can trace advantageously the shape of the food material, while conducting electricity or transferring heat to the pin support table 20.

As will be described below, the pin electrodes 10 are driven by varying the inner pressure of the pressure-variable gas chamber 30. Therefore, the clearance between the rod 12 and through-hole 21 can be, apparently, considered to affect the drive of the pin electrodes 10, but because this clearance is very small, as mentioned above, the amount of gas that leaks from the pressure-variable gas chamber 30 through the clearance is extremely small. As a result, the pressure fluctuation in the pressure-variable gas chamber 30 is very small and therefore, the clearance practically gives no effect on the drive of the pin electrodes 10. The drive of the pin electrodes 10 can be also easily realized by using an elastic tool such as a spring or rubber instead of the pressure-variable gas chamber.

The pin support table 20 functions as a power source or heat source with respect to the pin electrodes 10 and then, for the material of the pin support table is preferred a material having electric conductivity and thermal conductivity equal to or higher than those of the pin electrodes 10.

In accordance with the embodiment the pin support table 20 is of a plate-like shape, but may be of a composite shape having a curved surface.

The pressure-variable gas chamber 30 is composed of an inner space 31 that stores the gas, a channel 32 serving as a gas flow passage, and a gas port 33 linked to an external high-pressure gas source (compressor) or (vacuum) pump. The pressure adjustment of the inner space 31 is conducted by supplying or discharging gas via the channel 32. In a case where the pressure $P_{in}$ of the inner space 31 is higher than the external pressure $P_{out}$, a pressure gradient is produced between the inlet and the outlet of the through-hole 21 and the pin electrodes 10 are pushed down by the gas pressure of the inner space 31 and displaced downward. Where the pressure $P_{in}$ of the inner space 31 is lower than the external pressure $P_{out}$, a pressure gradient in the reverse direction is produced and the pin electrodes 10 are pushed up by the external air and displaced upward. Thus, by adjusting the pressure of the inner space 31, it is possible to displace the pin electrodes 10 relative to the pin support table 20. Further, by adjusting the pressure of the inner space 31 in a state in which the pin electrodes 10 are in contact with the food material, it is possible to change the pushing force of the pin electrodes 10 against the food material. Therefore, by adjusting the pressure of the inner space 31 in a state in which the pin electrodes 10 are brought into contact with the food material, it is possible to heat and hold the food material by the plurality of pin electrodes 10. Therefore, by providing the heating pin electrode 100 with a conveying means, it is possible to perform heating-holding-conveying of the food material with good stability by the electrode.

As the aforementioned gas, for example, clean air or an inert gas such as nitrogen can be preferably used.

Figure 2:
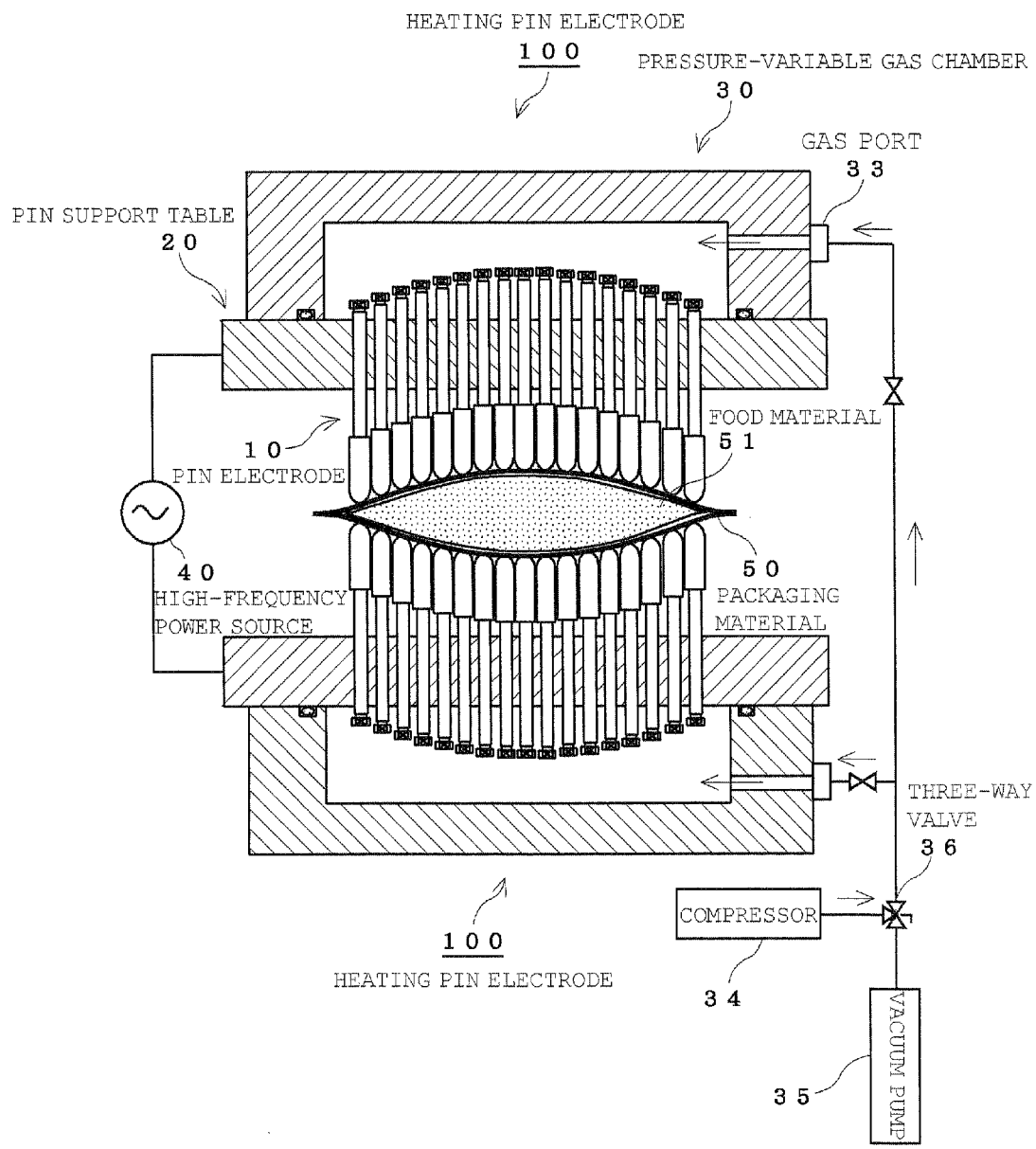
FIG. 2 is an explanatory drawing illustrating an example of heating food with the heating pin electrode relating to the heating electrode in accordance with the present invention.

FIG. 2 is an explanatory drawing illustrating an example of heating food with the heating pin electrode 100 relating to the heating electrode in accordance with the present invention.

In this heating example, a food material 51 packaged in a packaging material 50 is heated and held by heating pin electrodes 100, 100 that are disposed opposite each other in the up-down (vertical) direction, and the food material is conveyed by a conveying means (not shown in the figure), while receiving dielectric heating in a state in which the food material is positioned between the electrodes.

For example, in a case where a compressor 34 and a vacuum pump 35 are joined to the pressure-variable gas chamber 30 with a three-way valve 36 being interposed therebetween, pressure adjustment of the pressure-variable gas chamber 30 is conducted by switching the three-way valve to the side of the compressor 34 for pressurization or the side of the vacuum pump 35 for depressurization.

The frequency of the high-frequency power source 40 is, for example, in the band from several KHz to several hundreds of MHz, or from 3 MHz to 100 MHz.

The material of the packaging material 50 is, for example, a resin such as PE (polyethylene), PP (polypropylene), and PET (polyethylene terephthalate), a metal such as iron or aluminum, paper, glass, or a composite material in which the aforementioned materials are combined. The package form is not particularly limited and may be a film or a tray-shaped or cup-shaped container. The containers may be subjected to various types of surface treatment such as coating or vapor deposition.

In the present heating embodiment, dielectric heating using two heating pin electrodes 100, 100 is described, but the heating in accordance with the present invention is not limited only to the embodiment, and dielectric heating may be also conducted by using a combination of the heating pin electrode 100 with a usual plate-shaped electrode. Further, the electrodes may be arranged not only in the vertical direction, but also in the horizontal direction. Further, in a case where the package is in the form of a tray-shaped or cup-shaped container, the opposite other electrode may have the form matching the bottom shape of the container, as in the below-described embodiments.

Embodiment 1

Figure 3:
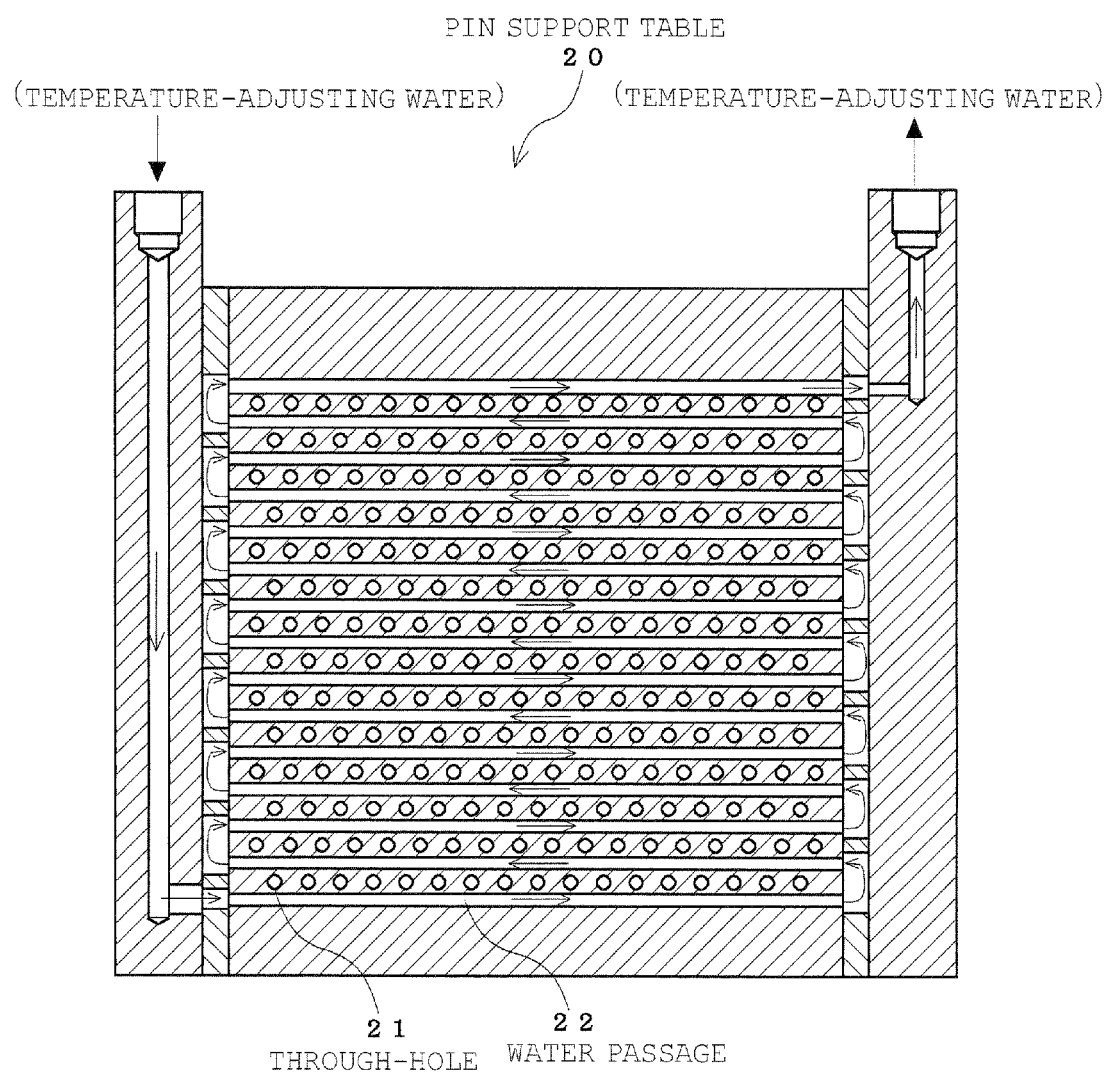
FIG. 3 is a principal sectional explanatory drawing illustrating a pin support table according to Embodiment 1.

FIG. 3 is a principal sectional explanatory drawing illustrating the pin support table 20 according to Embodiment 1.

In the pin support table 20, a water passage 22 for water adjusting temperature (referred to hereinbelow as "temperature-adjusting water") is provided in a transverse direction between the through-holes 21, 21. Therefore, by causing a flow of temperature-adjusting water in a state in which the pin electrodes 10 are brought into contact with the food material, it is possible to conduct simultaneously both the heat exchange between the pin electrodes 10 and food material and the heat exchange between the temperature-adjusting water and the pin electrodes 10. As a result, the food material surface is indirectly heated or cooled. Therefore, temperature control with good accuracy with respect to the food material can be conducted either by letting hot water to flow as the temperature-adjusting water in the case of insufficient heating where the temperature rise is slow, or by letting the cold water to flow as the temperature-adjusting water in the overheating case where the temperature rise is rapid such that the target temperature is exceeded. Thus, by forming the water passage 22 inside the pin support table 20 and letting the temperature-adjusting water to flow therethrough, it is possible to control the temperature of the food material more efficiency than by air-conditioning of the entire atmosphere. Further, by adjusting the output or frequency of a high-frequency power source 40, it is also possible to conduct the fine adjustment of heating temperature of the food material for which temperature adjustment is difficult.

Embodiment 2

Figure 4:
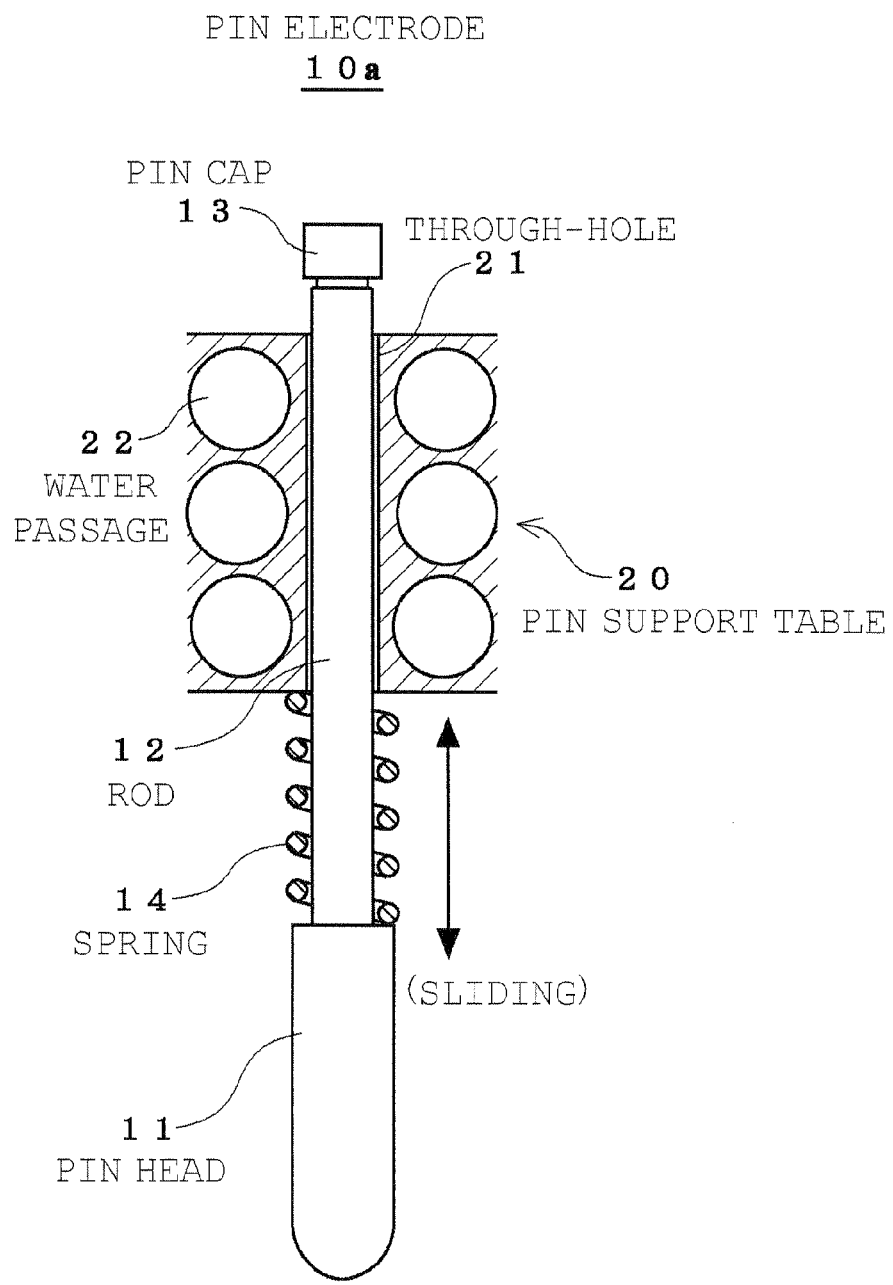
FIG. 4 is an explanatory drawing illustrating a pin electrode according to Embodiment 2.

FIG. 4 is an explanatory drawing illustrating a pin electrode 10a according to the embodiment 2.

This pin electrode 10a has a spring 14. For example, when the pin electrode 10 is wanted to be returned, the internal pressure of the pressure-variable gas chamber 30 has to be made to be in negative condition by the vacuum pump 35, but where the spring 14 is provided, the pin electrode can be automatically returned to the original position by an elastic force of the spring 14 when the internal pressure of the pressure-variable gas chamber 30 is caused to be released into the depressurized state. Thus, where the spring 14 is provided, the pin electrode has an automatic recovery function. As a result, the vacuum pump 35 becomes unnecessary and the drive structure of the pin electrode becomes to be simplified. As another advantage of the spring, for example, in a case where the pressure-variable gas chamber 30 is pressurized and the pin electrode is pushed out, the initial movement of the pin electrode is alleviated down by the elastic force of the spring 14. Thus, by providing the spring 14, the drive mechanism with relative displacement is simplified and the extension-contraction (relative displacement) movement of the pin electrode is stabilized.

Embodiment 3

Figure 5:
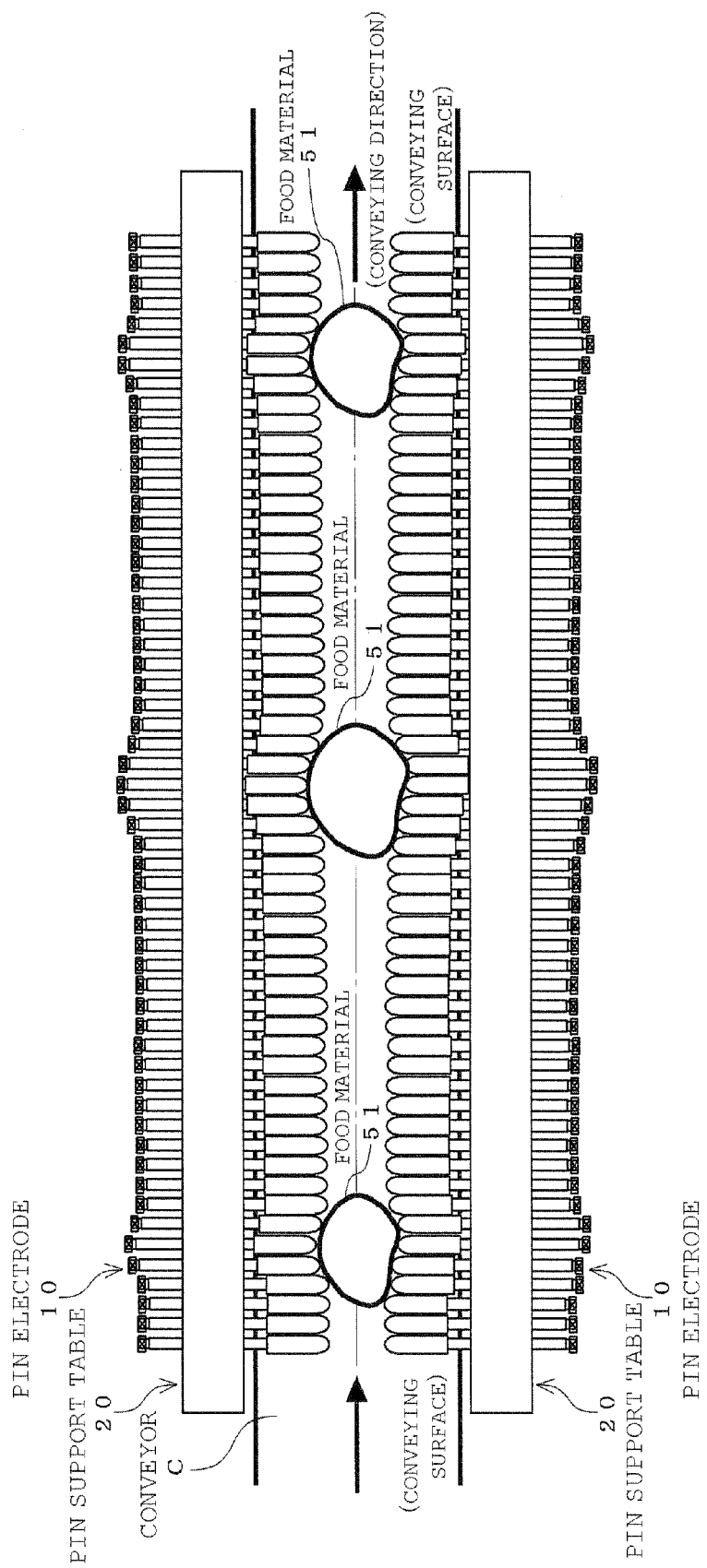
FIG. 5 is an explanatory drawing illustrating the heating method using the heating pin electrode according to Embodiment 3.

FIG. 5 is an explanatory drawing illustrating the heating method using the heating pin electrodes 100, 100 according to the embodiment 3. For the simplicity of the explanation, only the pin electrodes 10 and pin support table 20 are shown and other structural components are omitted.

These heating electrodes are disposed horizontally opposite each other so that the axial direction of the pin electrodes 10 is parallel to the conveying surface of the conveyor C and perpendicular to the conveying direction. Therefore, where the food material 51 is passed between the heating pin electrodes, while being conveyed by the conveyor C, the food material receives dielectric heating from the pin electrodes 10 and is heated and sterilized. The conveyor C may be stopped for a certain time, so that the food material 51 intensively receives dielectric heating from the pin electrodes 10 and is sterilized.

Embodiment 4

Figure 6:
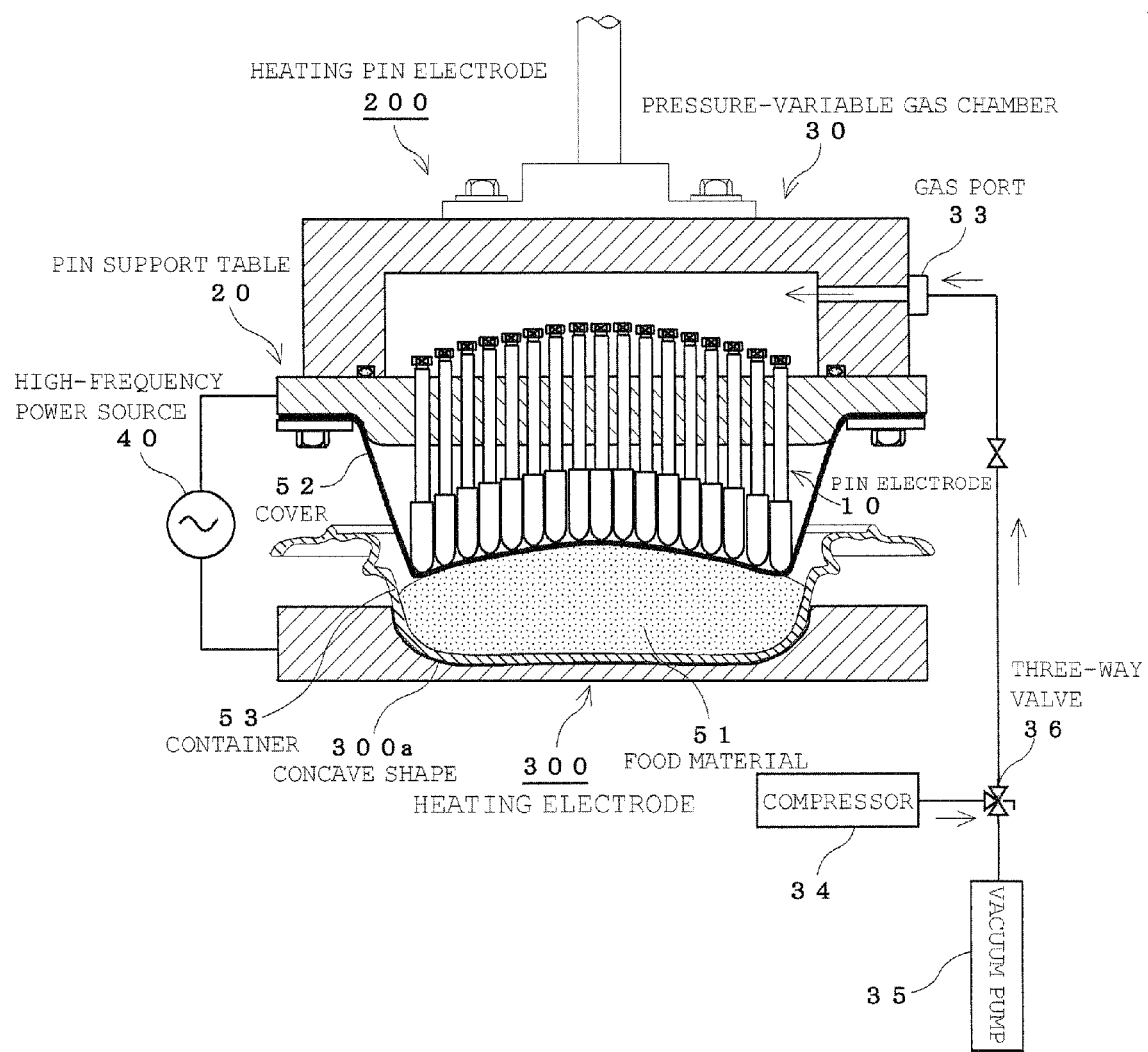
FIG. 6 is an explanatory drawing illustrating the heating method using the heating pin electrode and the heating electrode according to Embodiment 4.

FIG. 6 is an explanatory drawing illustrating heating method using a heating pin electrode 200 and a heating electrode 300 according to the embodiment 4.

In this heating method, the material to be heated is a food material 51 (food) that is filled in a container 53 such as a tray or a cup and is in an unsealed state. One electrode is a heating pin electrode 200 that is disposed above the food material, advantageously tracing the concave-convex shape of the food material 51 and heating the food material. The other electrode is a heating electrode 300 that is disposed below the food material, has a concave shape 300a that matches the bottom portion shape of the container 53, and heats the food material 51. In addition to the constitution of the heating pin electrode 100, the heating pin electrode 200 has a cover 52 that advantageously protects the pins from vapors generated from the food during heating or corrosion caused by the environment. The material of the cover 52 is not particularly limited, provided that it is flexible and does not hinder the movement of pins. For example, a silicone rubber or fluorocarbon rubber with a thickness of the degree of 0.3 mm to 5 mm, a thermoplastic resin film such as PP, PE, and PET with a thickness of the degree of 0.05 mm to 0.2 mm, composites thereof, and an electrically conductive metal foil or conductive foil such as aluminum, copper, carbon, titanium, and platinum may be used. The heating electrode 300 is manufactured by the process of forming an aluminum material into an intermediate with a concave shape molded to match the bottom portion shape of the container 53 and treating the surface of the intermediate with a Teflon coating, Dycron coating, or electroless nickel plating for high-corrosion resistant surface treatment. An electrically conductive material such as copper, carbon, titanium, and platinum may be also used.

In the above-described embodiments, food is used as a material to be heated, but the material to be heated in accordance with the present invention is not limited to food materials and includes all the materials that can be brought into contact with the heating pin electrode 100.

INDUSTRIAL APPLICABILITY

The heating electrodes in accordance with the present invention and the method for heating a material to be heated by using the heating electrodes can be especially advantageously applied to heating of materials of irregular shape.

The invention claimed is:

1. Heating electrodes that are disposed opposite each other and electrically heat a material to be heated, wherein
   at least one electrode of the heating electrodes is an assembly of pin electrodes formed of a plurality of electrically conductive pins, and the pin electrodes are able to be extended and contracted in an axial direction,
   the at least one electrode comprising:
   pin support means for supporting the pin electrodes to be axially slidable, and
   pin displacement means for displacing the pin electrodes axially relative to the pin support means,
   wherein the pin support means is formed of an electrically conductive base provided with a plurality of through-holes in which the pin electrodes can slide, and
   wherein the pin displacement means is formed of a pressure-variable gas chamber joined to the electrically conductive base, forms a pressure gradient in the through-holes by changing an inner pressure of the gas chamber, and displaces the pin electrodes in the axial direction.

2. The heating electrodes according to claim 1, wherein electricity or heat is applied to the electrically conductive base and then conducted or transferred to the pin electrodes via an inner wall of each of the through-holes.

3. The heating electrodes according to claim 2, wherein a flow passage of temperature-adjusting water that passes transversely between the through-holes is formed inside the electrically conductive base.

4. The heating electrodes according to claim 1, wherein the other of the heating electrodes has a concave shape molded to match a part of an outer surface shape of the material to be heated.

5. A method for heating a material to be heated by using heating electrodes, wherein
   the material to be heated is heated and held by the heating electrodes, or the material to be heated is heated while being moved relative to the heating electrodes,
   wherein the heating electrodes are disposed opposite each other, at least one electrode of the heating electrodes is an assembly of pin electrodes formed of a plurality of electrically conductive pins, and the pin electrodes are able to be extended and contracted in an axial direction,
   the at least one electrode comprising:
   pin support means for supporting the pin electrodes to be axially slidable, and
   pin displacement means for displacing the pin electrodes axially relative to the pin support means,
   wherein the pin support means is formed of an electrically conductive base provided with a plurality of through-holes in which the pin electrodes can slide, and
   wherein the pin displacement means is formed of a pressure-variable gas chamber joined to the electrically conductive base, forms a pressure gradient in the through-holes by changing an inner pressure of the gas chamber, and displaces the pin electrodes in the axial direction.

6. The method for heating a material to be heated by using heating electrodes according to claim 5, wherein heating and holding of the material to be heated is conducted via a packaging material.

7. The method for heating a material to be heated by using heating electrodes according to claim 5, wherein electricity or heat is applied to the electrically conductive base and then conducted or transferred to the pin electrodes via an inner wall of each of the through-holes.

8. The method for heating a material to be heated by using heating electrodes according to claim 7, wherein heating and holding of the material to be heated is conducted via a packaging material.

9. The method for heating a material to be heated by using heating electrodes according to claim 5, wherein a flow passage of temperature-adjusting water that passes transversely between the through-holes is formed inside the electrically conductive base.

10. The method for heating a material to be heated by using heating electrodes according to claim 9, wherein heating and holding of the material to be heated is conducted via a packaging material.

11. The method for heating a material to be heated by using heating electrodes according to claim 5, wherein the other of the heating electrodes has a concave shape molded to match a part of an outer surface shape of the material to be heated.

12. The method for heating a material to be heated by using heating electrodes according to claim 11, wherein heating and holding of the material to be heated is conducted via a packaging material.

* * * * *